United States Patent [19]

Dahan et al.

[11] Patent Number: 6,018,708
[45] Date of Patent: Jan. 25, 2000

[54] METHOD AND APPARATUS FOR PERFORMING SPEECH RECOGNITION UTILIZING A SUPPLEMENTARY LEXICON OF FREQUENTLY USED ORTHOGRAPHIES

[75] Inventors: Jean-Guy Dahan, Brookline, Mass.; Vishwa Gupta, Quebec, Canada

[73] Assignee: Nortel Networks Corporation, Montreal, Canada

[21] Appl. No.: 08/917,548

[22] Filed: Aug. 26, 1997

[51] Int. Cl.[7] .................................................. G10L 7/08
[52] U.S. Cl. ..................... 704/244; 704/235; 704/240; 704/257
[58] Field of Search ................................ 704/235, 240, 704/244, 256, 257, 243

[56] References Cited

U.S. PATENT DOCUMENTS

| | | | |
|---|---|---|---|
| 4,164,025 | 8/1979 | Dubnowski ET AL. | 364/900 |
| 4,751,736 | 6/1988 | Gupta et al. | 381/31 |
| 4,751,737 | 6/1988 | Gerson et al. | 381/43 |
| 4,797,910 | 1/1989 | Daudelin | 379/67 |
| 4,829,576 | 5/1989 | Porter | 704/235 |
| 4,852,180 | 7/1989 | Levinson | 704/256 |
| 4,956,865 | 9/1990 | Lennig et al. | 381/43 |
| 4,959,855 | 9/1990 | Daudelin | 379/213 |
| 4,979,206 | 12/1990 | Padden et al. | 379/67 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,226,044 | 7/1993 | Gupta et al. | 370/81 |
| 5,274,695 | 12/1993 | Green | 379/88 |
| 5,307,444 | 4/1994 | Tsuboka | 395/22 |
| 5,390,278 | 2/1995 | Gupta et al. | 395/2.52 |
| 5,488,652 | 1/1996 | Bielby et al. | 379/88 |
| 5,515,475 | 5/1996 | Gupta et al. | 395/2.51 |
| 5,692,097 | 11/1997 | Yamada et al. | 704/241 |
| 5,839,107 | 11/1998 | Gupta et al. | 704/270 |

OTHER PUBLICATIONS

Rabiner, L. R. and B. H. Juang, "An Introduction to Hidden Markov Models", *IEEE ASSP Magazine*, pp. 4–16 (Jan. 1986).

Bakis, R. and A. G. Cole, "Dynamic Modification of the Vocabulary of a Speech Recognition Machine", *IBM Technical Disclosure Bulletin*, vol. 27, No. 7A, pp. 3945–3946 (Dec. 1984).

Lennig, M. and D. Sharp, "Unleashing the Potential of Human–To–Machine Communication", *Telesis*, No. 97, pp. 23–27.

Lennig, M., "Putting Speech Recognition to Work in the Telephone Network", *Computer*, pp. 35–41 (Aug. 1990).

Young, S., "Large Vocabulary Continuous Speech Recognition: a Review", *Proceedings, IEEE Automatic Speech Recognition Workshop*, pp. 3–28 (Dec. 1995).

(List continued on next page.)

*Primary Examiner*—David R. Hudspeth
*Assistant Examiner*—Abul K. Azad
*Attorney, Agent, or Firm*—Foley & Lardner

[57] ABSTRACT

The invention relates to a method and an apparatus for recognising speech, more particularly to a speech recognition system and method utilising a speech recognition dictionary supplemented by a lexicon containing frequently occurring word sequences (orthographies). In typical speech recognition systems, the process of speech recognition consists of scanning the vocabulary database or dictionary by using a fast match algorithm to find the top N candidates that potentially match the input speech. In a second pass the N candidates are re-scored using more precise likelihood computations. The novel method comprises the introduction of a step in the search stage that consists of forcing the insertion in the list of N candidates entries selected from a lexicon containing frequently used orthographies to increase the probability of occurrence of certain text combinations.

47 Claims, 10 Drawing Sheets

OTHER PUBLICATIONS

Lennig, "Putting Speech Recognition to Work in the Telephone Network", *Bell–Northern Research and INRS–Télécommunications* pp. 35–41, (Aug. 1990).

Gorin et al., "Adaptive acquisition of language", *Computer Speech and Language* vol. 5, pp. 101–132 (1991).

Lennig et al., "Flexible Vocabulary Recognition of Speech Over the Telephone" *Bell–Northern Research and INRS–Telecomunications* pp. 1–3 (1992).

Lennig et al., "Automated Bilingual Directory Assistance Trial In Bell Canada" *Bell–Northern Research* pp. 1–14.

Gao et al., "Dynamic Adaptation of Hidden Markov Model for Robust Speech Recognition" *IEEE International Syposium on Circuits and Systems* 2:1336–1339 (1989).

Gupta et al., "Fast Search in a Large Vocabulary Word Recognizer" *J. Acoust. Soc. Am.* pp. 2007–2017 (1988).

Katz, Estimation of Probabilities from Sparse Data for the Language Model Component of a Speech Recognizer *IEEE Transactions on Acoustics Speech and Signal Processing* Assp.35 vol. No. 3.

Bahl et al., "Language–Model/ Acoustic–Channel–Model Balance Mechanism" *IBM Technical Disclosure Bulletin* 23:3464–3465 (1980).

METHOD AND APPARATUS FOR PERFORMING SPEECH RECOGNITION UTILIZING A SUPPLEMENTARY LEXICON OF FREQUENTLY USED ORTHOGRAPHIES

FIELD OF THE INVENTION

This invention relates to a method and an apparatus for automatically performing desired actions in response to spoken requests. It is applicable to speech recognition systems, specifically to connected word recognition systems and may be used to allow voice activated dialling (VAD), credit card number identification, flight information and other services.

BACKGROUND OF THE INVENTION

In addition to providing printed telephone directories, telephone companies provide information services to their subscribers. The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant. Consequently, telephone companies and telephone equipment manufacturers have devoted considerable efforts to the development of systems which reduce the labour costs associated with providing information services on the telephone network. These efforts comprise the development of sophisticated speech processing and recognition systems that can be used in the context of telephone networks.

In a typical speech recognition system the user enters his request using isolated word, connected word or continuous speech via a microphone or telephone set. The request may be a name, a city or any other type of information for which either a function is to be performed or information is to be supplied. If valid speech is detected, the speech recognition layer of the system is invoked in an attempt to recognize the unknown utterance. In a first pass search, a fast match algorithm is used to select the top N orthographies from a speech recognition dictionary. In a second pass search the individual orthographies are re-scored using more precise likelihood calculations. The top two orthographies in the re-scored group are then processed by a rejection algorithm that evaluates if they are sufficiently distinctive from one another so that the top choice candidate can be considered to be a valid recognition. However the accuracy of these systems, especially when designed for connected word recognition may not be always acceptable.

Thus, there exists a need in the industry to refine the speech recognition process such as to obtain a better recognition system with a high degree of accuracy particularly applicable to connected word recognition systems.

OBJECTS AND STATEMENT OF THE INVENTION

The present invention is directed to a method and an apparatus for performing speech recognition that offer improved recognition accuracy.

Another object of the invention is to provide a method and apparatus for performing speech recognition that offer improved recognition accuracy, particularly well suited in the context of connected word recognition.

Another object of this invention is to provide a computer readable storage medium containing a program element that directs a computer to perform speech recognition, the program element being designed such as to improve recognition accuracy.

Yet another object of this invention is to provide a computer readable storage medium containing a speech recognition dictionary.

As embodied and broadly described herein the invention provides a speech recognition system comprising:

means for receiving a spoken utterance by a user of said speech recognition system, a speech recognition dictionary including a plurality of orthographies potentially recognizable on a basis of the spoken utterance;

means for selecting from said dictionary, a list of orthographies, said list containing a plurality of orthographies, each orthography in said list being a candidate having a certain probability to correspond to the spoken utterance;

a standard text lexicon including a plurality of orthographies;

orthography insertion means for inserting at least one orthography from said standard text lexicon into said list to form an augmented list.

For the purpose of this specification the expression "word" is used to describe a representation of a sound or combination of sounds that forms a meaningful linguistic unit.

For the purpose of this specification the expression "connected word" designates a string of one or more words uttered with or without pause and where the combination of these words is likely to occur with a certain probability which can be determined on the basis of statistical measurements.

For the purpose of this specification the expressions "dictionary" and "standard text lexicon" designate each a data structure containing orthographies that can be mapped onto a spoken utterance on the basis of acoustic characteristics and, optionally, a-priori probabilities or another rule, such as a linguistic or grammar model. In a specific embodiment of this invention, the dictionary and the standard text lexicon are separate data structures that function independently from one another.

For the purpose of this specification the expressions "orthography" is a data element that can be mapped onto a spoken utterance that can form a single word or a combination of words.

For the purpose of this specification the expression "standard text" designates a word or a combination of words that are likely to be the correct match to a spoken utterance, either because they meet certain linguistic or other rules or because statistically they are more likely to be uttered by the user.

In a most preferred embodiment of this invention, the speech recognition system is integrated into a voice activated dialing system, such as one that could be used in a telephone network, that enables users to formulate requests by using subscriber terminal equipment such as mobile or fixed telephone sets. Once the voice activated system receives a request from the user, it will first issue a prompt over the telephone network requesting the user to specify the telephone number he wishes to call. If, after a pre-processing stage, valid speech is detected in response to this prompt, a speech search function is invoked that selects from a speech recognition dictionary a list of orthographies (in this example each orthography is a telephone number) that potentially match the spoken utterance. After the first pass search has been completed, the speech recognition system will insert into that list at least one entry from the standard text lexicon to form the augmented list. The standard text lexicon contains the most frequently called numbers by the user. This forced inclusion of one or more orthographies has the effect of increasing the probabilities of correct recognition since the imported entry is known to be correct or at least statistically to be uttered more often by the user. In one specific example, when the standard text lexicon contains only a few orthographies, it is possible to include all these orthographies in the list output as a result of the first pass search. In another possible embodiment, when the standard text lexicon includes too many orthographies, only a number of those orthographies are selected and then inserted in the list. Different strategies may be used to select the orthographies from the standard text lexicon that should be introduced in the list. The most preferred approach is to utilize the probabilistic scores established in selecting orthographies from the main speech recognition dictionary during the first pass search in order to compute scores for the orthographies in the standard text lexicon.

In a most preferred embodiment, the standard text lexicon is user specific. Thus, in a multi-user environment, a number of standard text lexicons will be provided, each lexicon being assigned to a specific user. Each lexicon can be assigned a specific identifier that is unique, such as the telephone number of the user. When the user invokes the voice activated dialing system, the telephone network supplies the telephone number of the user requesting the service and, on the basis of this information, the speech recognition system can select the lexicon from which orthographies will be inserted in the list output by the first pass search.

In another specific embodiment of this invention, the connected word recognition system is integrated into a flight information system, such as one that could be used in an airport facility to inform passengers of their flight time, that enables users to formulate requests by using subscriber terminal equipment such as mobile or fixed telephone sets. In this example, a single user independent standard text lexicon may include frequently requested city pairs or, alternatively, all valid city pairs served by a particular airline, each pair being associated with a certain probability of occurrence.

In another possible example, the speech recognition system is integrated into a credit card number recognition system, that enables users to effect commercial transactions by using subscriber terminal equipment such as mobile or fixed telephone sets. In this specific embodiment of the invention the dictionary would comprise all possible card numbers while a single user independent standard text lexicon may consist of the card number combinations of a particular card issuer.

As embodied and broadly described herein the invention provides a method for performing speech recognition, said method comprising the steps of:

receiving a spoken utterance by a user of said speech recognition system, providing a speech recognition dictionary including a plurality of orthographies potentially recognizable on a basis of the spoken utterance;

selecting from said dictionary, a list of orthographies, said list containing a plurality of orthographies, each orthography in said list being a candidate having a certain probability to correspond to the spoken utterance;

providing a standard text lexicon including a plurality of orthographies;

inserting at least one orthography from said standard text lexicon into said list to form an augmented list.

As embodied and broadly described herein, the invention also provides a machine readable storage medium containing a program element for directing a computer to recognize a spoken utterance, said computer including:

memory means including:

a) a speech recognition dictionary including a plurality of orthographies potentially recognizable on a basis of the spoken utterance;

b) a standard text lexicon including a plurality of orthographies;

processor means in operative relationship with said memory means, said program element instructing said processor means for:

a) selecting from said dictionary, a list of orthographies, said list containing a plurality of orthographies, each orthography in said list being a candidate having a certain probability to correspond to the spoken utterance;

b) inserting at least one orthography from said standard text lexicon into said list to form an augmented list.

As embodied and broadly described herein, the invention also provides a computer readable storage medium comprising:

a primary data structure containing a plurality of orthographies potentially recognizable on a basis of a spoken utterance, said primary data structure forming a speech recognition dictionary;

a plurality of secondary data structures, each secondary data structure including a plurality of orthographies and forming a standard text lexicon, each secondary data structure containing orthographies constituting a subset of the orthographies from said primary data structure;

a plurality of identifiers, each secondary data structure being associated with a respective identifier distinguishing the secondary data structure from other ones of said plurality of data structures.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

Figure 1:
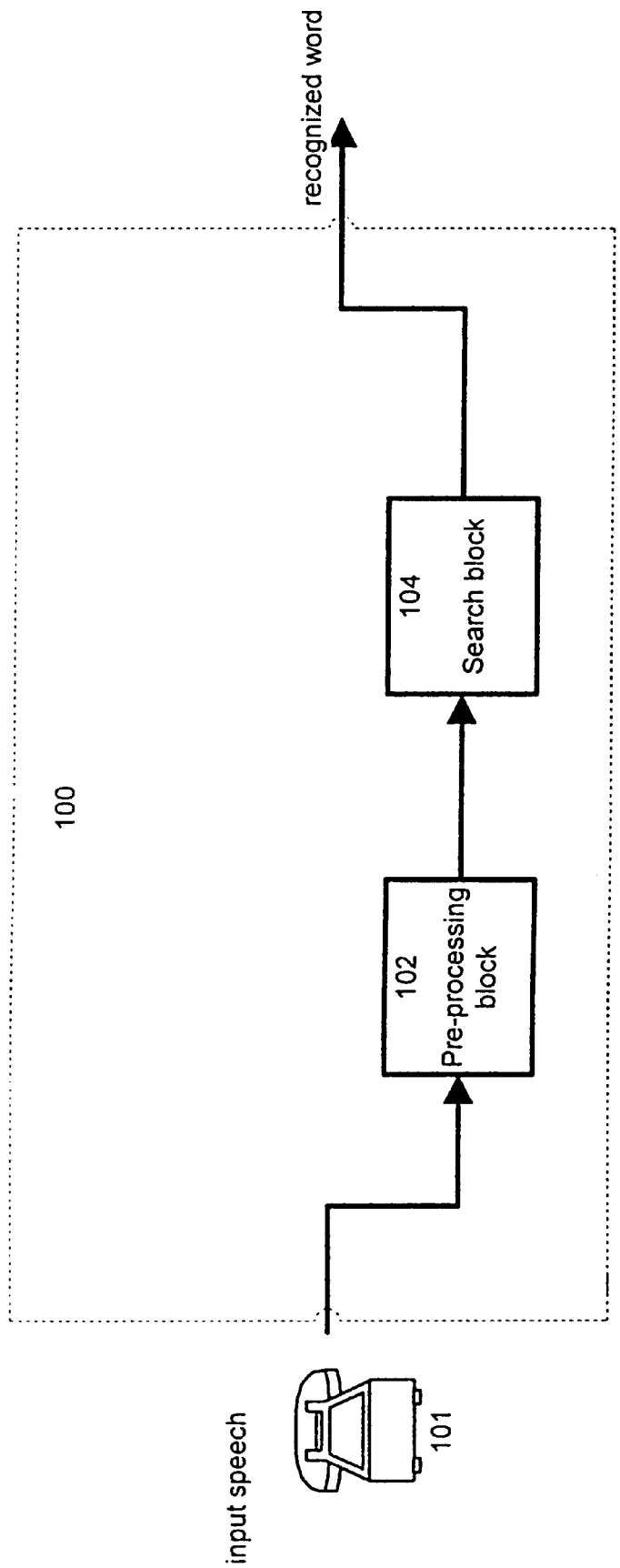
FIG. 1 is a simplified functional block diagram of a speech recognition system.

Speech recognition systems have been developed in many parts of the world and, although it is difficult to describe a standard recognition system architecture, some characteristics are shared between many of them. A typical speech recognition system, of the type depicted in FIG. 1 generally comprises a device such as a microphone or telephone set 101 to convert the spoken utterance into an electric signal and transmit the signal to the speech recognition unit 100. The speech recognition unit 100 can be split into two functional blocks namely a pre-processing block 102 and a search unit 104. The pre-processing unit 102, also called the acoustic processor, performs the segmentation, the normalisation and the parameterisation of the input signal waveform. In some cases, especially for connected word speech, this stage may also include a feature extraction operation. The search block 104 includes a speech recognition dictionary that is scored in order to find possible matches to the spoken utterance. The search may be done in several steps in order to maximise the probability of obtaining the correct result in the shortest possible time and most preferably in real-time.

Figure 2:
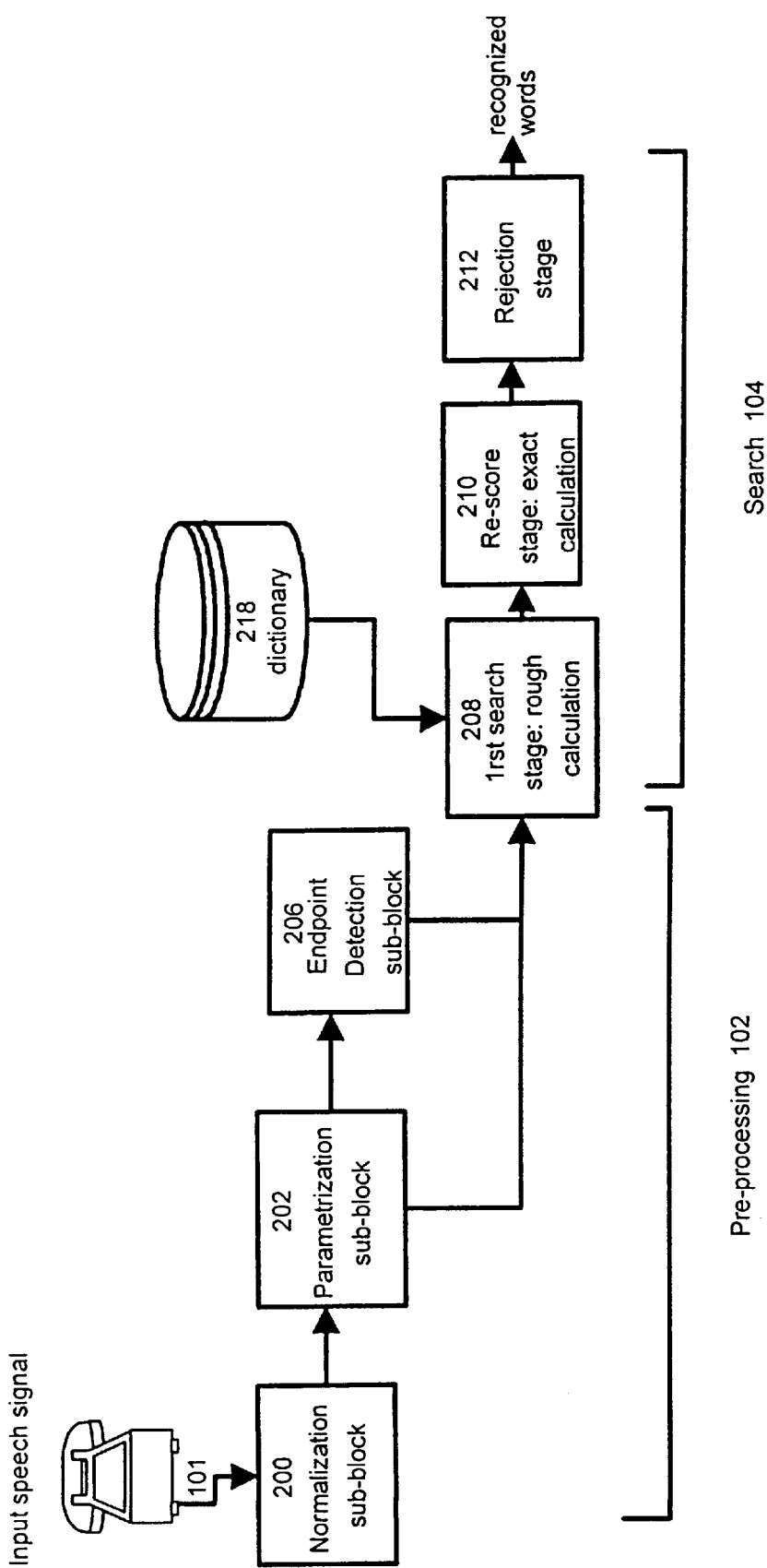
FIG. 2 is a more detailed functional block diagram of a speech recognition system.

More specifically, the purpose of the pre-processing block 102, illustrated in greater detail in FIG. 2, is first to translate the incoming analog speech waveform into digital format. This can be done with the use of a simple A/D converter, a spectrogram generator or any other suitable technique. The input signal is then split into short segments called analysis frames whose typical duration ranges from 5–20 ms. All further processing will be done relative to these frames. In general, the pre-processing block comprises a normalisation sub-block 200, a parameterisation sub-block 202 and an endpoint detection sub-block 206. The normalisation sub-block 200 adjusts the maximum signal amplitude of each analysis frame to a standard level in order to take into account variations in speech intensity, transmission losses and other physical effects such as distance from the microphone and recording level. The parameterisation sub-block 202 typically represents speech frames in terms of voicing decision, amplitude and fundamental frequency. A wide variety of parameters can be used in the parameterisation block the most common being LPC coefficients, Mel-based cepstral coefficients, energies in a channel vocoder and zero crossing rate in a band-pass channel. The final sub-block of the pre-processing module, the endpoint detection or segmentation sub-block 206 splits the input signal waveform into start and end of the speech utterance. This stage uses algorithms whose purpose is to locate the boundaries between silence and speech. In continuous and connected speech recognition, the endpoint detection stage is only used to provide a crude estimate of speech boundaries. In the 1980's, most systems used the short term energy and the zero crossing rate and indication of the beginning or end of a word. Currently, endpoint detection units use many parameters including frame energy, frame voice labels and other statistical variance parameters derived from speech.

The search functional block 104 shown in more detail in FIG. 2 ranks of all the branches in a dictionary such as to be able to derive the orthography or orthographies which have the highest probability of matching the spoken utterance. This block comprises three functional layers of speech processing and a dictionary. The purpose of performing the search in three separate stages is to improve the performance in terms of computation and speed. The first rough calculation stage 208, also called first pass search stage allows the system to eliminate those orthographies that are most unlikely to constitute a match to the spoken utterance. For these orthographies, the exact score assigned by a more precise calculation (e.g. Viterbi) would serve no useful purpose. However, the time saved by performing a simpler calculation improves the performance in speed of the system by several orders of magnitude.

More specifically, the first pass search stage 208, performs some rough probabilistic calculations and extracts from the speech recognition dictionary 218 a list of possible candidates for the spoken utterance. Typical algorithms that can be used at this stage include the fast score estimation and the graph search algorithms. As a reference, the reader is invited to consult Gupta V. N., Lennig M., Mermelstein P. "A fast search strategy in a large vocabulary word recogniser INRS-Telecommunications. J. Acoust. Soc. Am. 84 (6), December 1988, p.2007 and U.S. Pat. No 5,515,475 by inventors Gupta V. N. & Lennig M. The content of these documents is incorporated herein by reference.

The second layer, often called the re-score stage 210, performs more precise calculations but only on the top N candidates in the list supplied by the first pass search. At this stage, techniques such as the Viterbi algorithm with complete allophone models and model distances will be used. Although these require heavy complex computations, the number of candidates for which the computation must be performed has been greatly reduced. The result of the re-score stage is a short list of orthographies with their associated exact scores (probabilities of being a match to the spoken utterance). The two highest-ranking orthographies in the list are then typically transferred to the rejection stage 212.

The rejection stage 212, compares the two top orthographies obtained by the re-score stage 210 and, according to a chosen threshold, will determine if a possibly correct mapping was found or if there is confusion between the two top orthographies. If the difference between the two top orthographies is such that it is less than the threshold, the system may abort the operation on the basis that a resolution between the two orthographies cannot be made. On the other hand if the difference between the orthographies is sufficient, the one having the highest score is output as the best choice. As a reference, the reader is invited to consult U.S. Pat. No. 5,097,509 by inventor Lennig M. entitled "A Rejection Method for speech recognition".

The speech recognition dictionary 218 used in the above described procedure can be organised in numerous ways. The dictionary may be stored in the form of a graph where the links between nodes are words with their associated probabilities. The organisation of the dictionary can have a significant impact on the performance of the speech recognition system.

Figure 3:
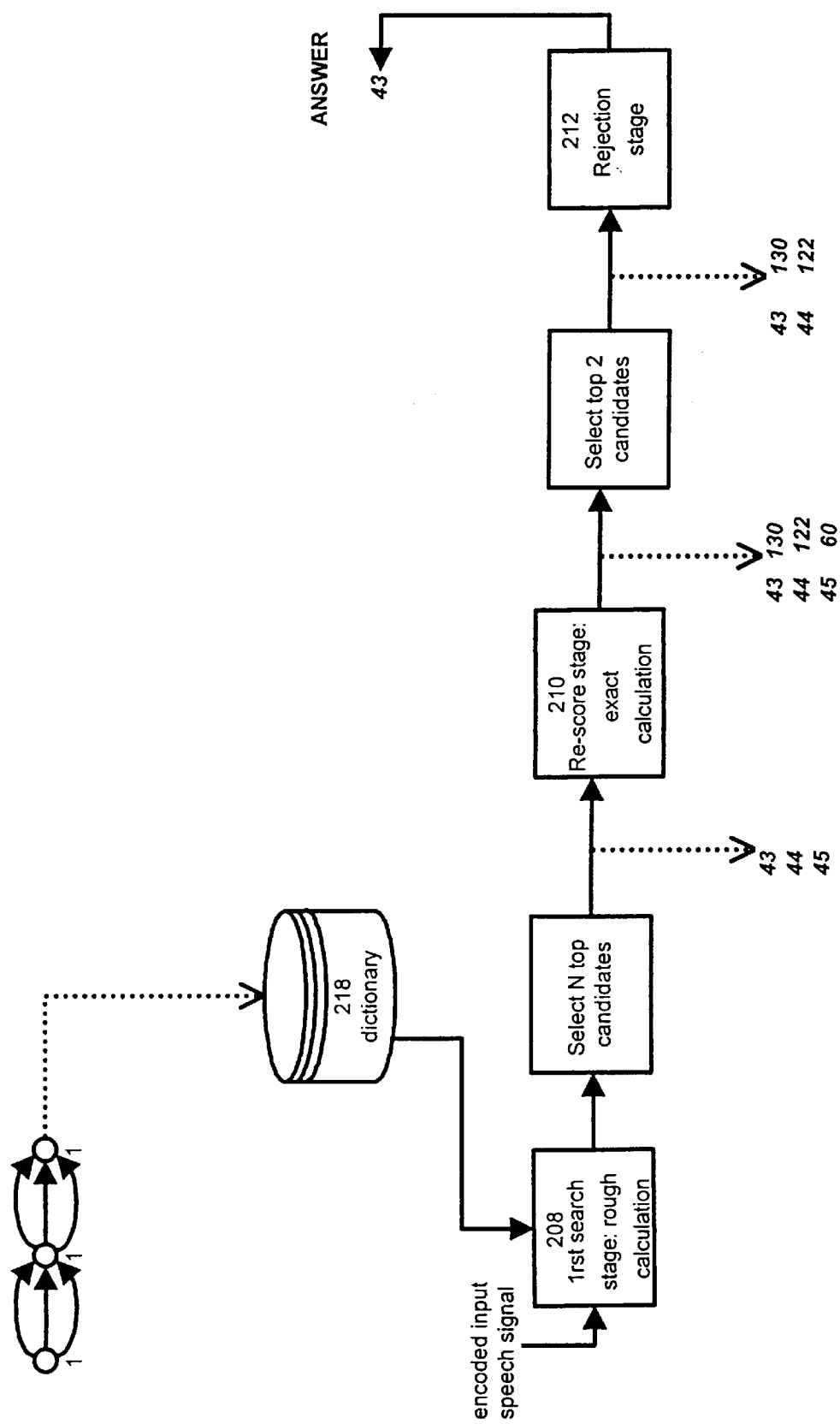
FIG. 3 is a flow chart illustrating the operation of a typical speech recognition system.
Figure 3A:
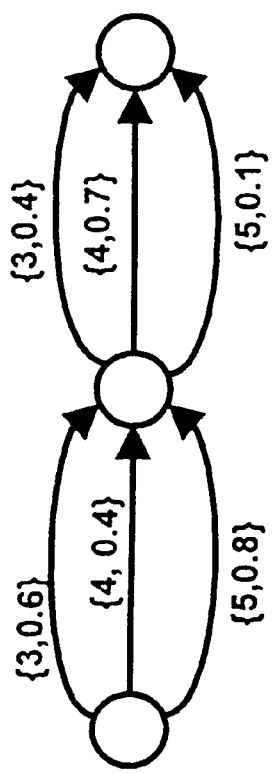
FIG. 3a shows a graph illustrating an example of a dictionary that uses a-priori probabilities.

A simple example of the operation of a prior art speech recognition system is illustrated by the flow chart of FIG. 3. The speech recognition dictionary 218 contains only three words, namely the digits 3, 4 and 5. Assume that what must be recognized is an utterance consisting of two digits. FIG. 3a is a possible illustration of the dictionary in the form of a graph. The circles are called nodes and the paths between the nodes are called branches. Each branch is assigned a word (digit in this case) and optionally an a-priori probability. The following nomenclature is used to designate the various parameters: {digit, a-priori probability}.

Figure 3B:
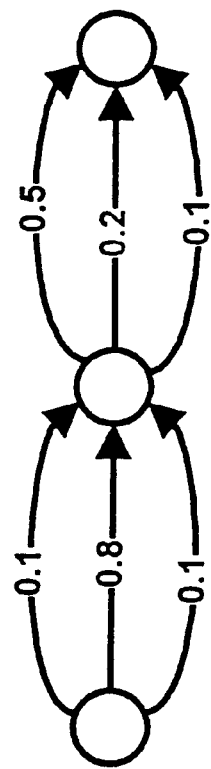
FIG. 3b shows a graph scored using acoustic measurements.

Assume that the input speech is the digit combination "33", both digits being uttered separately with or without pause between them. The objective of the first pass search is to score all the branches in the graph. The results are shown in FIG. 3b where each branch has an acoustic score associated with it. For the sake of simplicity, the a-priori values have been ignored. Including the effect of the a priori advisor can be done by multiplying the acoustic score of a given branch with the branch a priori probability. The first pass search stage then selects the top N scores in the graph. In this example consider only the top three scores. After reordering the results, the first search stage yields the following candidate list:

| Candidate |
|---|
| 43 |
| 44 |
| 45 |

This list is then passed to the re-score stage 210 that calculates more precise likelihood for each candidate. Note that the re-scoring is performed only for the candidates in the list. In a real world situation the list is much longer, typically containing between 6 and 30 entries. The re-scoring will be effected only on the top N candidates, N ranging typically from 6 to 30.

The results of the re-scoring stage could be the following:

| Candidates | Match Scores |
|---|---|
| 43 | 130 |
| 44 | 122 |
| 45 | 60 |

The two top scores in the previous table are sent to the rejection layer 212 which computes the likelihood of the top choice being correct using the P3 rejection algorithm (for more details on this algorithm see U.S. Pat. No. 5,097,509). In simple terms, this algorithm computes the following:

IF (rejection value>Threshold Value) Submit top score as answer

ELSE Invoke default procedure, such as passing the matter to a human operator.

As shown in the above example the uttered speech "33" is not recognised because it was not included in the top 3 candidates sent to the re-score stage 210. The string "43" would be selected instead yielding an incorrect choice. This problem is addressed by the present invention.

In the normal course of speech recognition, the first pass search should score the correct orthography located in the speech recognition dictionary in such a way that it will be in the top N candidates sent to the re-score stage. That way, the re-score stage is able to select the correct orthography and submit it as a probable match of the uttered speech. If the uttered speech is not in the dictionary, the system may reject the utterance or put out an incorrect choice.

In some cases, it may occur that a speech utterance is rejected or that an incorrect choice is selected when the correct orthography is actually present in the speech recognition dictionary. In the case of the two-pass search technique described previously, the first pass stage may result in the top N candidates which do not include the correct orthography. This occurs in the case where there are many similar orthographies in the dictionary, when N is small or when the rough calculations lack precision. Against this background it appears that the process of building the candidate list during the first pass search is a crucial step in the speech recognition process. Should the correct orthography be omitted during the first pass search, the re-score stage will not be able to correct the error resulting in a false recognition event.

This problem can be addressed by sending a longer list of possible candidates to the re-score stage (i.e. make N a larger number) hereby increasing the chances that the actual correct orthography will be re-scored. This approach, however, has the effect of increasing significantly the computational load that may render the system impractical to use, particularly in real-time applications.

The present inventors have made the unexpected discovery that by using a standard text lexicon to store frequently used orthographies and forcing the insertion of one or more orthographies from the lexicon into the list of orthographies output by the first pass search, the recognition accuracy of the system can be significantly improved.

Figure 4:
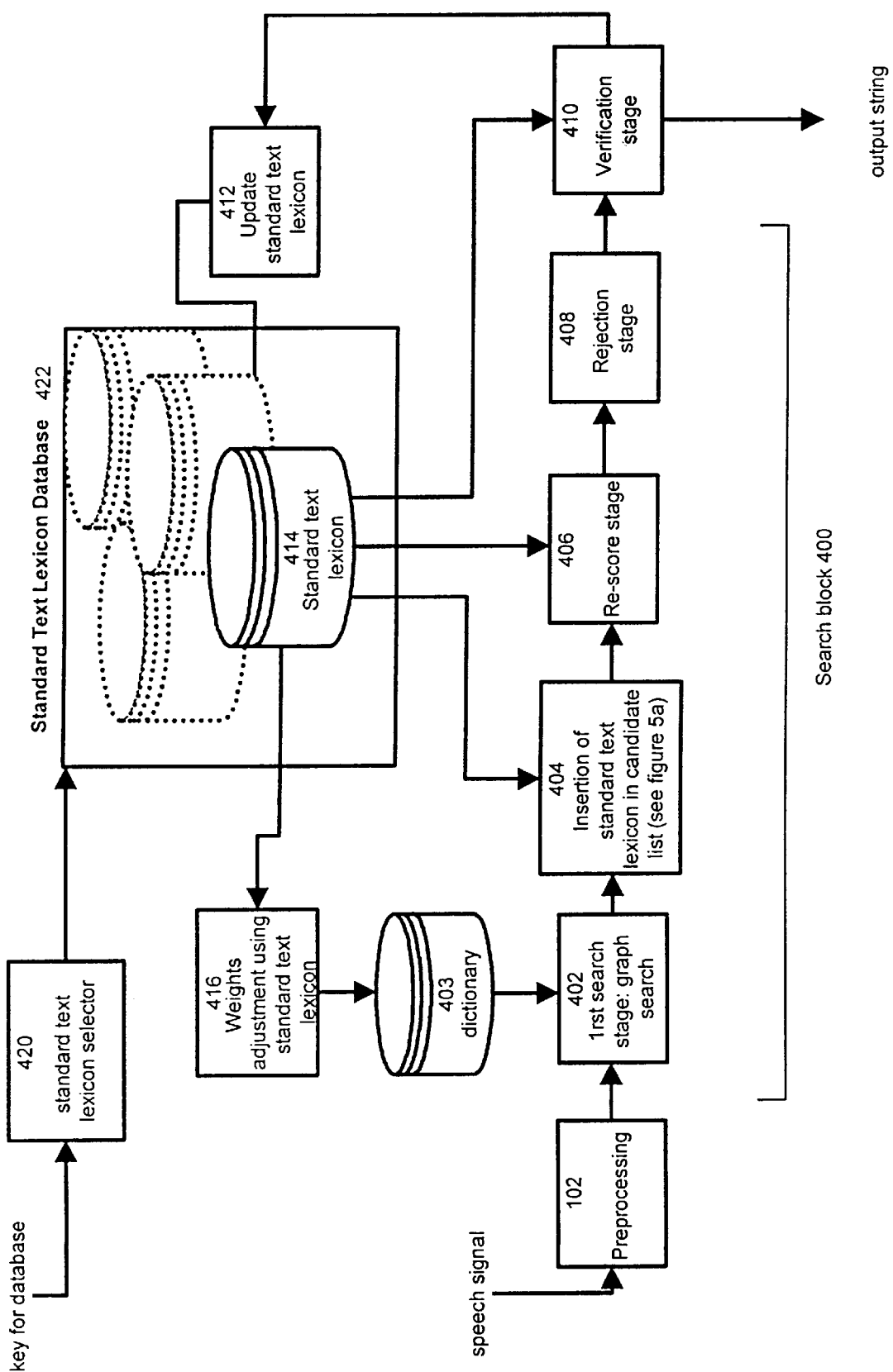
FIG. 4 is a functional block diagram of a speech recognition system designed in accordance with the invention.

In a most preferred embodiment of the present invention, the speech recognition system, as best shown in FIG. 4, includes the pre-processing block 102 described earlier that parameterizes the incoming signal and performs some basic endpoint detection. In a specific example Mel-based cepstral coefficients are used to parameterize the incoming signal. This method is well known in the art and more information can be obtained in "Discrete Time Processing of Speech Signals" by Deller & als. MacMillan publishing New York and in Gupta V. N., Lennig M., Mermelstein P. "A fast search strategy in a large vocabulary word recogniser INRS-Telecommunications. J. Acoust. Soc. Am. 84 (6), December 1988, p.2007, whose contents are hereby incorporated by reference.

The speech recognition system also comprises a search block 400 including four functional sub-blocks. The first sub-block, is referred to as the "first pass search stage" 402, scores all the branches in a dictionary 403 by performing a rough estimation of the similarity between each orthography in the dictionary 403 and the uttered speech. These calculations may be done with the use of the graph search algorithm or any other algorithm suitable for this task. The graph search algorithm estimates likelihood for each branch in a graph based on both acoustics and a-priori probabilities. A heuristic algorithm then produces an ordered list of candidates, with the highest likelihood candidate being listed first. Preferably, the dictionary model 403 used in the speech recognition system is based on a chosen linguistic unit such as phonemes, allophones, words or phrases. Depending on the application of the speech recognition system, the orthographies stored in the data structure forming the dictionary can be represented by a graph, a Hidden Markov Model (HMM) or any other suitable representation where the probabilities associated between each transition may be evaluated based on both acoustic and, optionally a-priori and/or linguistic properties. These representations are well known to one skilled in the art to which the invention pertains. In the example of a voice activated dialing system, the nodes in the graph represent the digit positions in the telephone number and the transition branches represent each of the digits with its associated probability in the given position (FIG. 3a). The design of the dictionary can be varied without detracting from the spirit of the invention since all that is needed is a model where the entries can be scored to provide probability measures depicting the probability a certain text has been uttered.

The second functional sub-block 404 effects the insertion of orthographies from a standard text lexicon 414 in the top N candidate list generated by the first-pass search to generate an augmented list. The standard text lexicon is a data structure that contains orthographies that are likely to be correct choices thus their inclusion in the list passed to the re-score stage is likely to augment the recognition accuracy. The standard text lexicon 414 contains a frequently used sub-set of the orthographies in the main dictionary 403. The data structure of the standard text lexicon 414 includes chosen linguistic units such as phonemes, allophones, words or phrases depending on the application of the speech recognition system. Preferably, the data in the standard text lexicon is represented by a tree structure as shown in FIG. 6a or any other representation fashion where the probabilities associated between each transition may be of equal weight (null) or weighted according to their frequency of occurrence. When searching such a tree, each branch is given a score based either on acoustic properties or, optionally, on both acoustic and a-priori probabilities. Including the a-priori scores in the computation involves multiplying the acoustic score of a given branch with the a-priori probability of that branch. The result of this search is a list of top L orthographies from the standard text lexicon with scores associated to each one.

Figure 5:
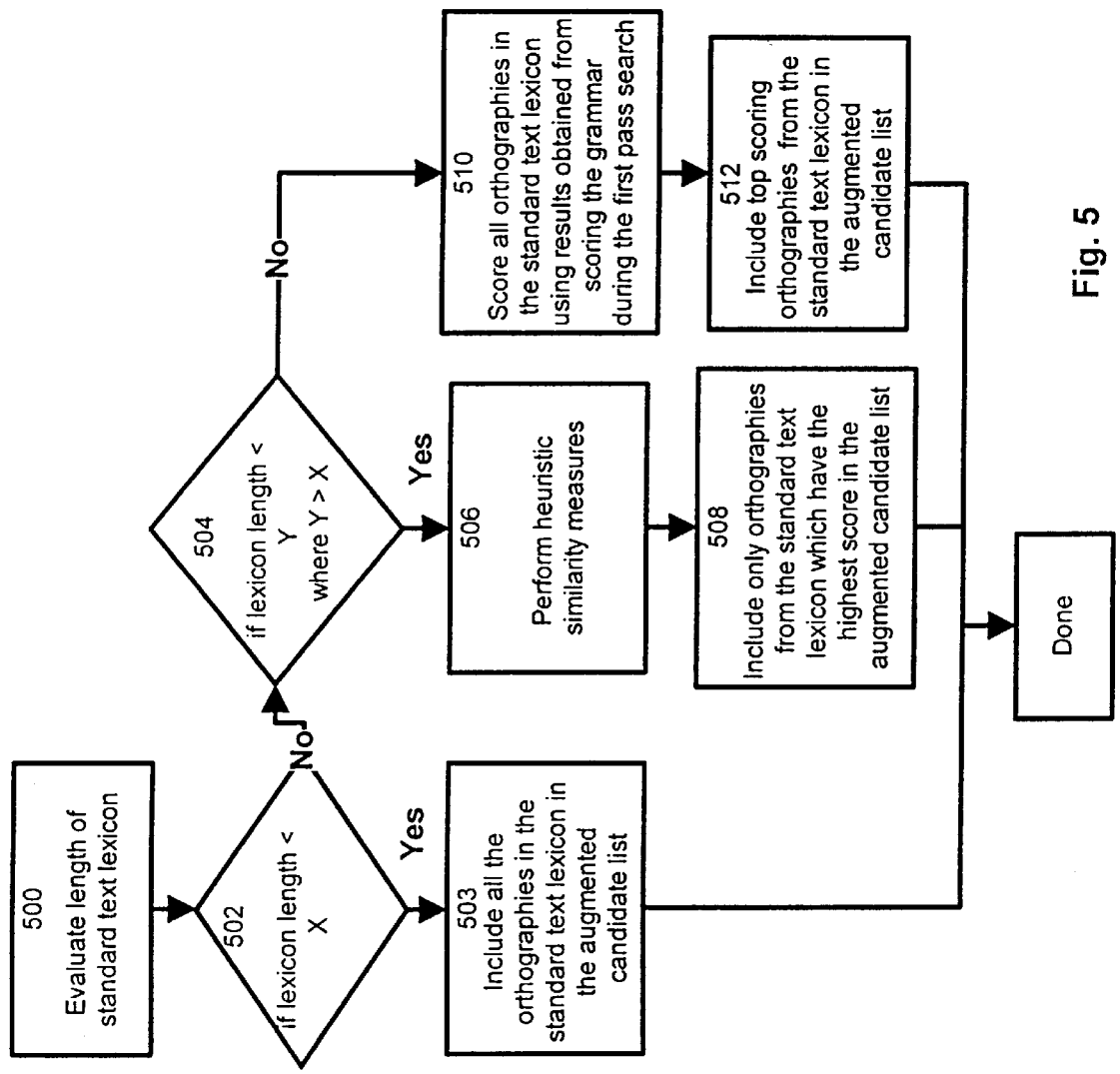
FIG. 5 is a flow chart illustrating the operation of the functional block that effects the forced inclusion of orthographies from the standard text lexicon.

The top L orthographies in the standard text lexicon that are added to the top N candidates in the list to form an augmented candidate list are selected by using a particular algorithm depending on the size of the standard text lexicon. FIG. 5 illustrates the program logic followed in the selection of the appropriate orthography insertion algorithm. At step 500 the length of the standard text lexicon is evaluated. If at decision step 502 the lexicon contains less than X orthographies, X being typically around 20, all the orthographies of the standard text lexicon are inserted at step 503 in the list of the top N candidates output by the first pass search. If at decision step 504, however, the system determines that the standard text lexicon is of moderate length, say containing orthographies in the range from X to Y, Y being typically in the range of 500 to 1000, only the orthographies selected by using a heuristic similarity measure are inserted. In a specific example, a heuristic similarity measure (e.g. levinstein distance metric) is performed at step 506. The levinstein distance method compares the similarity of the top N choice orthographies obtained from the first pass search with the orthographies in the standard text lexicon. Only the top L orthographies that have the highest score are inserted in the top N candidate list that is output by the first pass search stage, as shown at step 508. If at step 504 the system determines that the standard text lexicon is long, i.e. it has more than Y orthographies, the orthographies are scored at step 510 by using a fast score estimation algorithm. Most advantageously, this is effected by using the branch likelihoods estimated by the graph search effected at the first pass search stage and inserting in the top N candidate list only the top L scores of the standard text lexicon 512. Note that since the standard text lexicon 414 is a subset of the dictionary 403, there is no need to recompute all the scores in the branches since this operation was performed in the first pass search. All that is required here is a mechanism to transfer the scores established at the first pass search stage to the standard text lexicon. Any suitable data transfer process can be used here without departing from the spirit of the invention. An example of this is shown in Gupta V. N., Lennig M., Mermelstein P. "A fast search strategy in a large vocabulary word recogniser INRS-Telecommunications. J. Acoust. Soc. Am. 84 (6), December 1988, p.2007. It should be noted that other algorithms may also be used to perform the scoring of the standard text lexicon and to determine how the orthographies from the standard text lexicon are inserted in the list of top N candidates.

The size of the standard text lexicon may be fixed such that only the previous K or, alternatively, the most likely K orthographies remain on the machine readable medium. Alternatively, the standard text lexicon may be of variable size such that the size of the lexicon grows indefinitely with each new speech utterance entered. Because of physical and economic limitations, the former is usually chosen for the physical implementation of the standard text lexicon. The standard text lexicon may initially be empty or contain a pre-determined list of frequently used orthographies depending on the application in which the speech recognition system is used. For example in a voice activated dialing system (VAD) the standard text lexicon may be initialized with frequently called numbers or may be initialized by the user himself requesting him to enter a few of his commonly called telephone numbers the first time the system is used. Alternatively, the standard text lexicon may be left initially blank and filled as the user enters new text verbally.

The standard text lexicon may also be user specific. As a concrete example, a voice activated dialing system may contain a standard text lexicon of orthographies for each user or group of users. The standard text lexicons are stored in a machine readable medium as a data base 422 and are indexed using an identifier such as the user's telephone number. Preferably, each telephone number is associated with a unique standard text lexicon and, conversely, each standard text lexicon is associated with a unique telephone number. As a variant, many phone numbers can be associated to a given standard text lexicon, such as a cellular number and a residence number for the same user, without detracting from the spirit of the invention. The speech recognition system also includes a lexicon selection block 420 that receives the identifier and on that basis selects the appropriate standard text lexicon. For example a hash table or a binary search could both be used to select the correct standard text lexicon from the database. These algorithms are well known in the art to which this invention pertains.

At this point, the list generated by the combination of the N top candidate of the first pass search and the standard text lexicon candidates, which we will designate as the augmented candidate list, is processed by the third step, called the re-score stage 406. The re-score stage 406 consists of performing a detailed acoustic match analysis for every candidate in the augmented candidate list. Typically, algorithms such as the Viterbi trellis or other similar algorithms well known in the art are used at this stage. During the re-score stage, we may also use a-priori probabilities of the supplied orthographies in order to favor frequently occurring strings.

The result of the re-score stage is a short list of orthographies with their associated exact scores (probabilities of being a match to the spoken utterance). The two highest-ranking orthographies in the list are then transferred to the fourth and final stage of the search, which we call the rejection layer 408. This operation can be performed by the algorithm described in U.S. Pat. No. 5,097,509 or some other type of rejection algorithm which allows the comparison of 2 or more candidates. The rejection layer compares the two top orthographies obtained by the re-score stage and, according to a chosen threshold, will determine if a possibly correct mapping was found or if there is confusion between the two top orthographies. For example, if the difference between the two top orthographies is such that it is less than the threshold, the system may abort the operation on the basis that a resolution between the two orthographies cannot be made.

Figure 7:
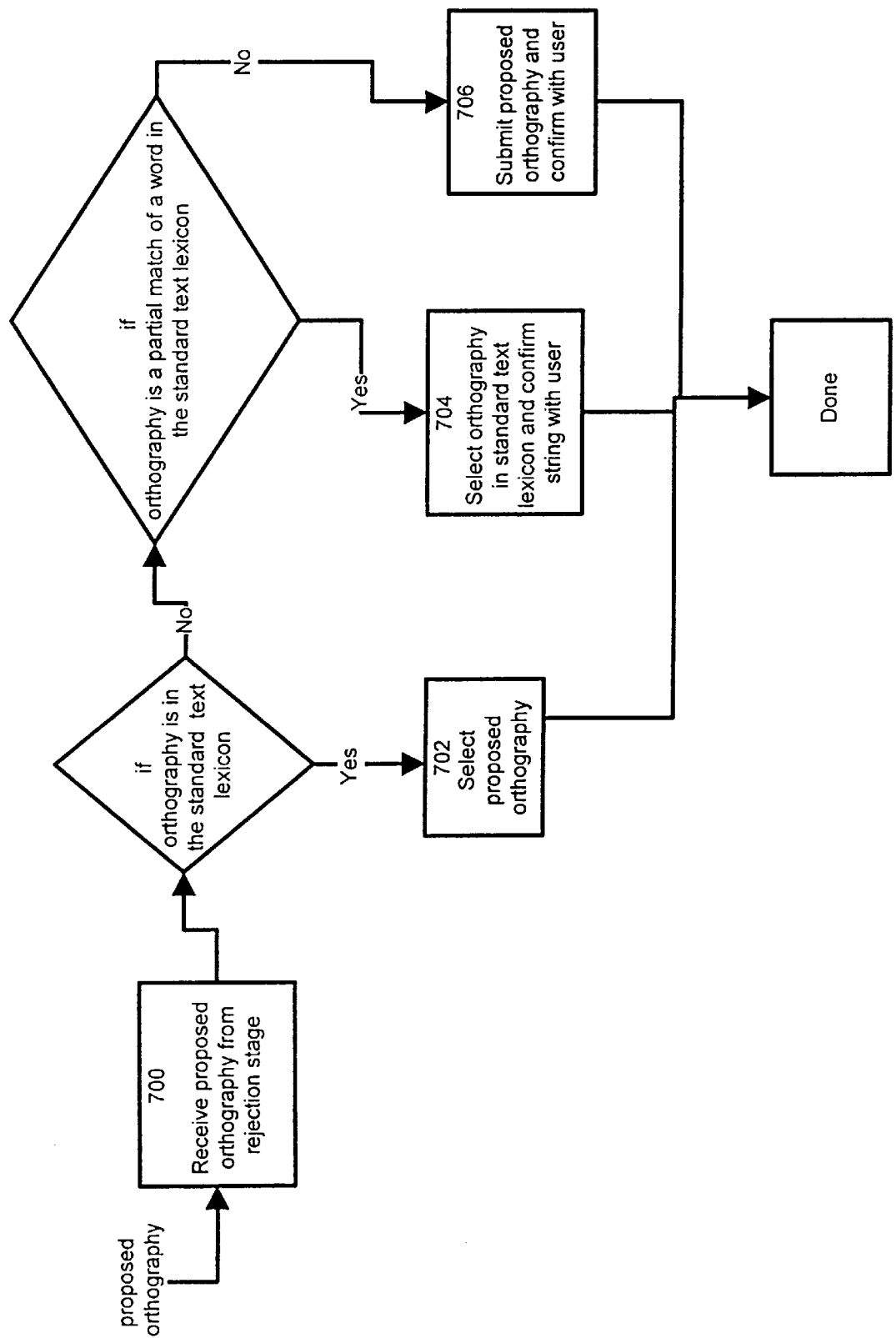
FIG. 7 is a flow chart of the operation of a verification sub-unit of the speech recognition system in accordance with the invention.

The verification block 410, shown in more detail in FIG. 7, is used to perform a final verification of the top choice orthography such as to reduce the error rate. The proposed orthography is received 700 by the verification stage and cross-checked against the standard text lexicon giving the candidates which are present in the standard text lexicon a higher rating than those which are not. The verification is performed according to the following rules:

1) If a perfect match is found between the selected orthography and the standard text lexicon the system selects the recognized word automatically 702.
2) If a partial match is found between the recognized word and a word in the standard text lexicon (using a heuristic similarity measure such as the levinstein metric), the system selects the word in the standard text lexicon and asks the user for confirmation 704.
3) If no match is found, or if the standard text lexicon is empty, the system selects the recognised string and asks the user for confirmation 706.

Any of the above steps in the verification stage may be absent and their particular behaviour may be dependent upon the application.

Figure 8:
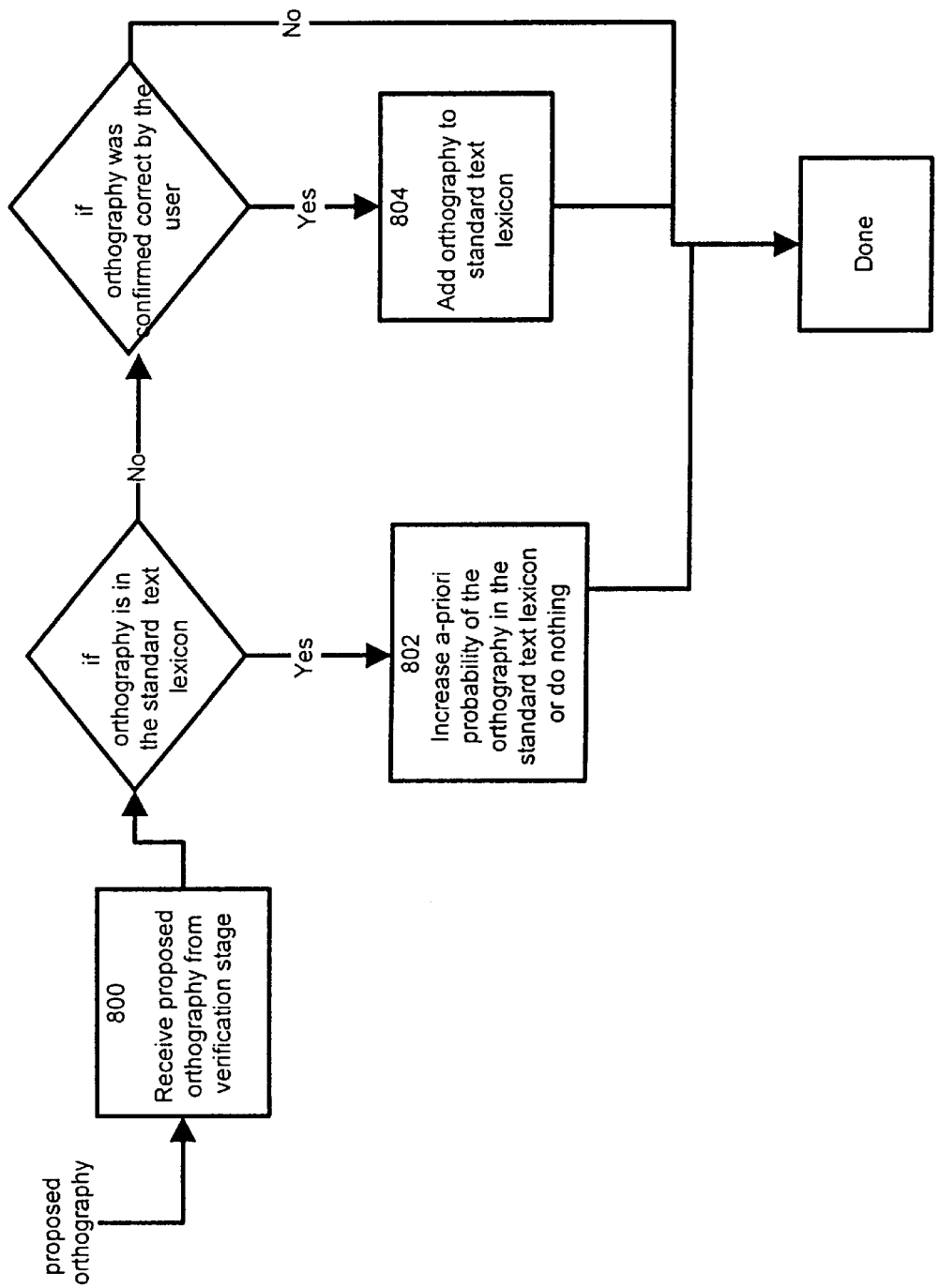
FIG. 8 shows a flow chart illustrating the decision logic of an update operation of the standard text lexicon.

Following the verification stage, the standard text lexicon is updated 412, immediately or at a later time, to reflect the user's calling pattern. In the preferred embodiment of the invention, this updating procedure is performed using the following logic shown in FIG. 8:

1) If the recognized word is in the standard text lexicon, the a-priori probability of the word may be incremented or alternatively the standard text lexicon may be left unchanged 800.
2) If the recognized word is not in the standard text lexicon and was confirmed to be correct by the user it may be added to the standard text lexicon 802.
3) If the recognized word is not in the standard text lexicon and was confirmed to be incorrect by the user no operation is performed on the standard text lexicon 804.

In addition to scoring the orthographies in the dictionary, this invention provides a process that permits the adjustment of weights 416 in order to increase the probability of certain word combinations. The module controlling the modification of the probability 416 communicates with the standard text lexicon database and the dictionary in order to establish a speech pattern for a given speaker. These dictionary statistics may be stored along with the user's standard text lexicon in a database. Computation of new probabilities 416 for the orthographies stored in the dictionary 403 of the speech recognition system gives previously used orthographies a higher a priori probability than unused orthographies. For example, in a voice activated dialing system, if the majority of the numbers called begin with the area code "514" then the dictionary can be modified to assign a higher weight to the digit 5 at the beginning of the number, to the digit 1 in the middle and to the digit 4 at the end.

EXAMPLE OF SPEECH RECOGNITION USING NOVEL METHOD

Figure 6:
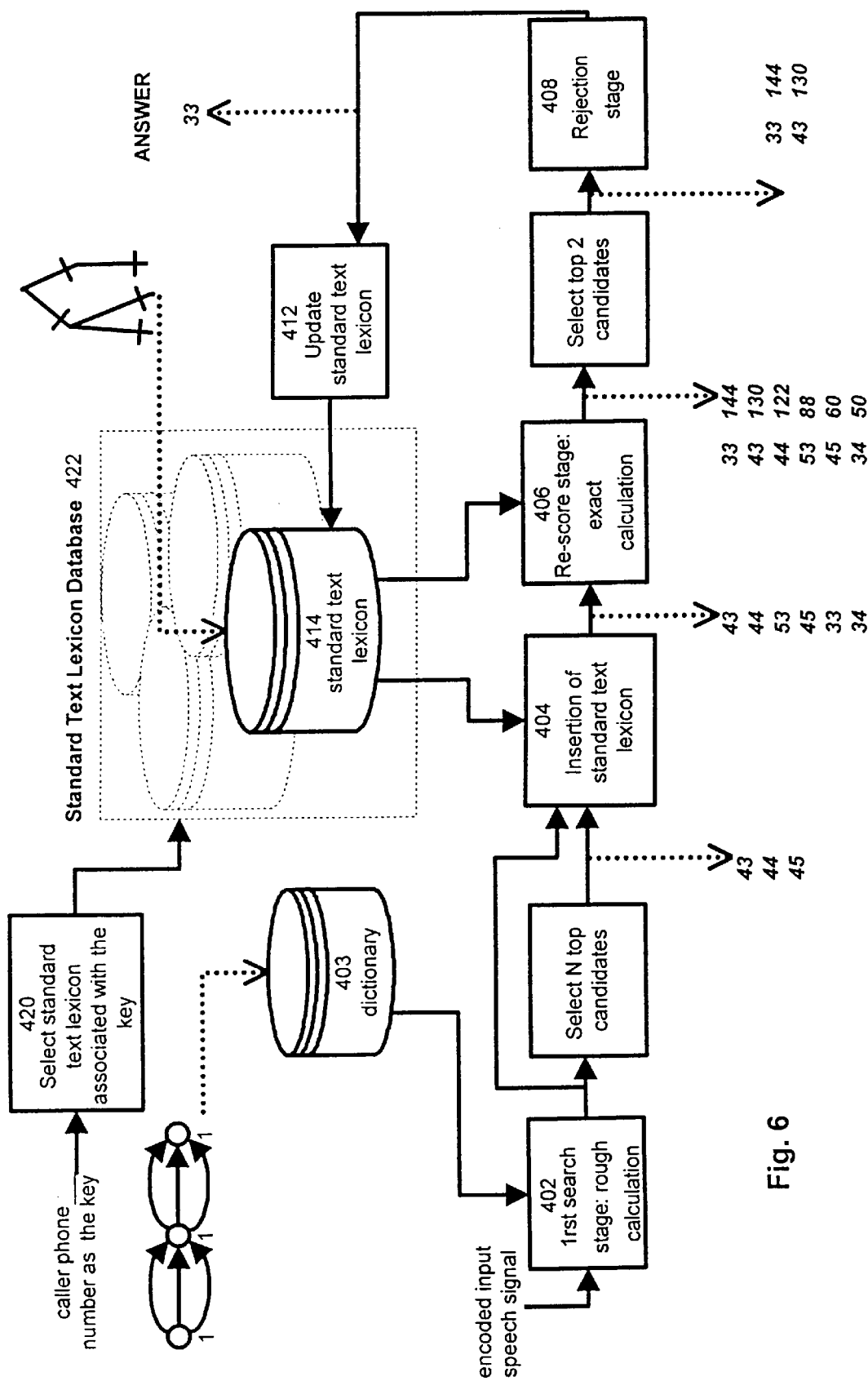
FIG. 6 is a flow chart illustrating the operation of a speech recognition system in accordance with the invention.
Figure 6A:
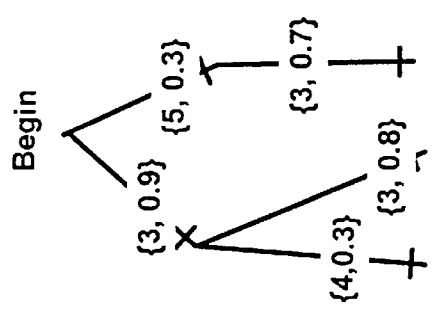
FIG. 6a shows a tree illustrating an example of a standard text lexicon that uses a-priori probabilities.

The following example will illustrate the above concepts and is shown in FIG. 6. We must mention at this time that the numbers used for the probability computations are there simply for illustration purposes and no explicit meaning should be conferred to them other than to illustrate the spirit of the invention.

As a simple example, let us take the same set of numbers used to illustrate the functioning of a prior art speech recognition system. As previously, the speech recognition dictionary consists of three digits, namely {3,4,5} and these digits must be combined pair-wise during speech. The dictionary then consists of all possible combinations of two of these digits. FIG. 3a shows a possible illustration of the dictionary in the form of a graph. Each branch is labelled with the digit to which it corresponds and, optionally, an a-priori probability and is presented using the following nomenclature: {digit, a-priori probability}.

We assume that the input speech is the digit string "33". The first stage of the search 402, which can be performed in the same fashion as in the prior art, after reordering the results, and assuming the re-score stage accepts only 3 candidates, yields the following candidate list:

| Candidate |
| --- |
| 43 |
| 44 |
| 45 |

The following stage in this process is the insertion of the standard text lexicon elements 404. Let us assume that the standard text lexicon associated with the user terminal station consists of the following numbers:

| Standard text lexicon |
| --- |
| 34 |
| 33 |
| 53 |

Figure 6B:
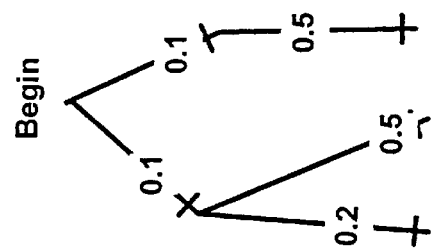
FIG. 6b shows a tree scored using values obtain from the previous scoring of the graph depicted in FIG. 3b.

We choose here to store these numbers in a tree structure as shown in FIG. 6a. In this case we also assign a priori probabilities for each branch in the tree. Using the acoustic scores computed on the dictionary during the graph search, we score the branches in the standard text lexicon and choose the L top scores or alternatively we include the whole list. Since all the texts in the standard text lexicon are present in the dictionary, there is no need to recompute the scores directly from the uttered speech. We can simply apply the levinstein distance metric described earlier or use the pre-computed branch probabilities calculated in the first stage. For example, in FIG. 3b, the digit 3 in the first position has a weight of 0.1. Therefore, in the standard text lexicon shown in FIG. 6b, the digit 3 will also have a weight of 0.1. This type of computation is done for every branch and path in the tree. Since the standard text lexicon is much smaller than the dictionary, this computation is feasible for the applications concerned with this invention. In this example, since the list is short, we choose to include all the numbers in the standard text lexicon. As a result, we obtain an augmented candidate list that can be passed on along with the N top choices from the dictionary to the re-score stage 406.

| Augmented Candidate list |
|---|
| 43 |
| 44 |
| 45 |
| 53 |
| 33 |
| 34 |

The re-score stage 406 will only compute the exact results for the items of this candidate list. The resulting table could be the following:

| Candidates | Probability of match with the spoken utterance (exact calculation) |
|---|---|
| 33 | 144 |
| 43 | 130 |
| 44 | 122 |
| 53 | 88 |
| 45 | 60 |
| 34 | 50 |

The two top scores in the previous table are sent to the rejection layer 408 which computes the likelihood of the top choice being correct using the P3 rejection algorithm (for more details on this algorithm see U.S. Pat. No. 5,097,509). In simple terms, this algorithm computes the following:

```
IF (rejection value > Threshold Value)
     Submit top score as answer
ELSE
     Abort operation or default to human operator
```

The verification stage then performs some crosschecking with the standard text lexicon. Since the desired string "33" is present in the standard text lexicon, the system requires no confirmation from the user and proceeds in connecting the call. If that were not the case the system would request confirmation from the user before proceeding and, following this, the standard text lexicon may be updated 412 to include the newly used orthographies.

Although the present invention has been described in considerable detail with reference to certain preferred versions thereof, other versions are possible. For example in a flight information system, flights could be identified by source and destination cities where typical airlines fly to 300 cities which would result in a search space of 300×300 city pairs. However the valid pairs are often lower than these numbers and certain flight have a greater a priori probability of being requested. Hence in the context of the method described above a single standard text lexicon can be used and may include the list of valid city pairs or the list of frequently requested flights while the dictionary may contain all the possible city combinations whether or not flights occur between them. Therefore, the spirit and scope of the appended claims should not be limited to the description of the preferred versions contained herein.

The reader's attention is directed to all papers and documents which are filed concurrently with or previous to this specification in connection with this application and which are open to public inspection with this specification, and the contents of all such papers and documents are incorporated herein by reference.

We claim:

1. A speech recognition system comprising:
    an input for receiving a spoken utterance by a user of said speech recognition system;
    a speech recognition dictionary including a plurality of orthographies potentially recognizable on a basis of the spoken utterance;
    a first processing unit operative to process said speech recognition dictionary to derive on the basis of the spoken utterance a list of orthographies, said list containing a plurality of orthographies, each orthography in said list being a candidate having a certain probability to correspond to the spoken utterance;
    a standard text lexicon including a plurality of orthographies;
    orthography insertion unit for inserting at least one orthography from said standard text lexicon into said list to form an augmented list.

2. A speech recognition system as defined in claim 1, comprising second processing unit for processing said augmented list for selecting an orthography from said augmented list as a possible candidate to the spoken utterance.

3. A speech recognition system as defined in claim 2, wherein said second processing unit includes a re-scoring unit to rank orthographies in said augmented list on a basis of acoustic match with the spoken utterance.

4. A speech recognition system as defined in claim 3, wherein said second processing unit includes a rejection unit.

5. A speech recognition system as defined in claim 2, wherein said orthography insertion unit inserts into said list all the orthographies present in said standard text lexicon.

6. A speech recognition system as defined in claim 2, wherein said standard text lexicon includes M orthographies, said orthography insertion unit inserts into said list N orthographies present in said standard text lexicon, where $M \geq N$.

7. A speech recognition system as defined in claim 6, wherein said orthography insertion unit includes scoring means for scoring orthographies in said standard text lexicon on a basis of a potential match with the spoken utterance.

8. A speech recognition system as defined in claim 7, wherein said first processing unit is operative to generate probability data indicative of a likelihood of an orthography to constitute a match to the spoken utterance, said scoring means utilizing said probability data for scoring orthographies in said standard text lexicon on a basis of a potential match with the spoken utterance.

9. A speech recognition system as defined in claim 1, wherein said standard text lexicon and said dictionary share at least one common orthography.

10. A speech recognition system as defined in claim 9, wherein the orthographies in said standard text lexicon form a sub-set of the orthographies in said dictionary.

11. A speech recognition system as defined in claim 1, comprising a plurality of standard text lexicons.

12. A speech recognition system as defined in claim 11, comprising selection means for selecting one of said plurality of standard text lexicons for use as a source by said insertion unit in inserting at least one orthography from the selected one of said plurality of standard text lexicons into said list.

13. A speech recognition system as defined in claim 12, including a plurality of unique identifiers, each identifier being associated with a respective standard text lexicon and allowing to distinguish one standard text lexicon from another standard text lexicon.

14. A speech recognition system as defined in claim 13, wherein said selection means is capable of receiving data indicative of an identifier, said selection means being capable of processing said data to select the standard text lexicon associated with the identifier designated by the received data.

15. A speech recognition system as defined in claim 14, wherein said data is indicative of a telephone number of a caller.

16. A voice activated dialing system comprising the speech recognition system of claim 1.

17. A method for performing speech recognition, said method comprising the steps of:
- receiving a spoken utterance by a user of said speech recognition system;
- providing a speech recognition dictionary including a plurality of orthographies potentially recognizable on a basis of the spoken utterance;
- processing said speech recognition dictionary to derive on the basis of the spoken utterance a list of orthographies, said list containing a plurality of orthographies, each orthography in said list being a candidate having a certain probability to correspond to the spoken utterance;
- providing a standard text lexicon including a plurality of orthographies;
- inserting at least one orthography from said standard text lexicon into said list to form an augmented list.

18. A method as defined in claim 17, comprising the step of processing said augmented list for selecting at least one orthography from said augmented list as a possible candidate to the spoken utterance.

19. A method as defined in claim 18, comprising the step of ranking orthographies in said augmented list on a basis of acoustic match with the spoken utterance.

20. A method as defined in claim 19, comprising the step of processing selected ones of the orthographies ranked in said augmented list to evaluate how distinctive the selected ones of said orthographies are with relation to one another.

21. A method as defined in claim 17, comprising the step of inserting all the orthographies in said standard text lexicon in said list.

22. A method as defined in claim 17, wherein said standard text lexicon includes M orthographies, comprising the step of inserting into said list N orthographies present in said standard text lexicon, where $M \geq N$.

23. A method as defined in claim 22, comprising the step of scoring orthographies in said standard text lexicon on a basis of a potential match with the spoken utterance.

24. A method as defined in claim 22, wherein said step of processing said speech recognition dictionary to derive on the basis of the spoken utterance a list of orthographies comprises the step of generating probability data indicative of a likelihood of an orthography to constitute a match to the spoken utterance, the step of scoring orthographies in said standard text lexicon including the step of utilizing said probability data.

25. A method as defined in claim 17, wherein said standard text lexicon and said dictionary share at least one common orthography.

26. A method as defined in claim 25, wherein the orthographies in said standard text lexicon form a sub-set of the orthographies in said dictionary.

27. A method as defined in claim 17, comprising the step of providing a plurality of standard text lexicons.

28. A method as defined in claim 27, comprising the step of selecting one of said plurality of standard text lexicons for use as a source in the step of inserting at least one orthography from the selected one of said plurality of standard text lexicons into said list.

29. A method as defined in claim 28, comprising the step of providing a plurality of unique identifiers, each identifier being associated with a respective standard text lexicon and allowing distinguishing one standard text lexicon from another standard text lexicon.

30. A method as defined in claim 29, comprising the step of receiving data indicative of an identifier and processing said data to select the standard text lexicon associated with the identifier designated by the received data.

31. A method as defined in claim 30, wherein said data is indicative of a telephone number of a caller.

32. A machine readable storage medium containing a program element for directing a computer to recognize a spoken utterance, the computer including:
- memory unit including:
  - a) a speech recognition dictionary including a plurality of orthographies potentially recognizable on a basis of the spoken utterance;
  - b) a standard text lexicon including a plurality of orthographies;
- processor in operative relationship with the memory unit, said program element being executable by the processor and being operative for:
  - a) processing said speech recognition dictionary to derive on the basis of the spoken utterance a list of orthographies, said list containing a plurality of orthographies, each orthography in said list being a candidate having a certain probability to correspond to the spoken utterance;
  - b) inserting at least one orthography from the standard text lexicon into said list to form an augmented list.

33. A machine readable storage medium as defined in claim 32, wherein said program element instructing the processor for processing the augmented list for selecting an orthography from the augmented list as a possible candidate to the spoken utterance.

34. A machine readable storage medium as defined in claim 32, wherein said program element instructing the processor to rank orthographies in the augmented list on a basis of acoustic match with the spoken utterance.

35. A machine readable storage medium as defined in claim 34, wherein said program element instructing the processor for processing selected ones of the orthographies ranked in the augmented list to evaluate how distinctive the selected ones of the orthographies are with relation to one another.

36. A machine readable storage medium as defined in claim 32, wherein said program element instructing the processor for inserting all the orthographies in the standard text lexicon in said list.

37. A machine readable storage medium as defined in claim 32, wherein the standard text lexicon includes M orthographies, said program element instructing the processor for inserting into said list N orthographies present in the standard text lexicon, where $M \geq N$.

38. A machine readable storage medium as defined in claim 37, wherein said program element instructing the processor for scoring orthographies in the standard text lexicon on a basis of a potential match with the spoken utterance.

39. A machine readable storage medium as defined in claim 38, wherein said program element instructing the processor for generating probability data indicative of a likelihood of an orthography to constitute a match to the spoken utterance when selecting from the dictionary a list of orthographies, said program element also instructing the processor to score orthographies in the standard text lexicon by utilizing said probability data.

40. A machine readable storage medium as defined in claim 32, wherein the standard text lexicon and the dictionary share at least one common orthography.

41. A machine readable storage medium as defined in claim 32, wherein the orthographies in the standard text lexicon form a sub-set of the orthographies in the dictionary.

42. A machine readable storage medium as defined in claim 32, wherein the computer includes a plurality of standard text lexicons.

43. A machine readable storage medium as defined in claim 42, wherein said program element instructing the processor for selecting one of the plurality of standard text lexicons for use as a source for inserting at least one orthography from the selected one of the plurality of standard text lexicons into said list.

44. A machine readable storage medium as defined in claim 43, wherein the memory unit contains a plurality of unique identifiers, each identifier being associated with a respective standard text lexicon and allowing distinguishing one standard text lexicon from another standard text lexicon.

45. A machine readable storage medium as defined in claim 44, comprising wherein said program element directs the processor for receiving data indicative of an identifier and processing the data to select the standard text lexicon associated with the identifier designated by the received data.

46. A machine readable storage medium as defined in claim 45, wherein the data is indicative of a telephone number of a caller.

47. A speech recognition apparatus comprising:

means for receiving a spoken utterance by a user of said speech recognition apparatus;

a speech recognition dictionary including a plurality of orthographies potentially recognizable on a basis of the spoken utterance;

means for processing said speech recognition dictionary to derive on the basis of the spoken utterance a list of orthographies, said list containing a plurality of orthographies, each orthography in said list being a candidate having a certain probability to correspond to the spoken utterance;

a standard text lexicon including a plurality of orthographies;

means for inserting at least one orthography from said standard text lexicon into said list to form an augmented list.

* * * * *